United States Patent [19]

Morales et al.

[11] Patent Number: 4,588,709

[45] Date of Patent: May 13, 1986

[54] CATALYST FOR REMOVING SULFUR AND METAL CONTAMINANTS FROM HEAVY CRUDES AND RESIDUES

[75] Inventors: Alfredo L. Morales; Roberto Galiasso, both of San Antonio de Los Altos; Angel R. Carrasquel; Jose A. Salazar, both of Los Teques, all of Venezuela

[73] Assignee: Intevep, S.A., Caracas, Venezuela

[21] Appl. No.: 724,969

[22] Filed: Apr. 19, 1985

Related U.S. Application Data

[63] Continuation-in-part of Ser. No. 563,197, Dec. 19, 1983, Pat. No. 4,520,128.

[51] Int. Cl.$^4$ .................................... B01J 23/24
[52] U.S. Cl. .................. 502/314; 502/323; 502/337; 502/338; 208/216 PP; 208/217; 208/251 H
[58] Field of Search ............ 208/216 PP, 251 H, 215, 208/217; 502/313, 314, 323, 337, 338, 355, 439

[56] References Cited

U.S. PATENT DOCUMENTS

| | | | |
|---|---|---|---|
| 3,403,111 | 9/1968 | Colgan et al. | 208/217 |
| 3,755,150 | 8/1973 | Mickelson | 208/217 |
| 3,840,473 | 10/1974 | Beuther et al. | 502/220 |
| 3,891,541 | 6/1975 | Oleck et al. | 258/216 PP |
| 3,898,155 | 8/1975 | Wilson | 208/251 H |
| 4,032,435 | 6/1977 | Schmitt, Jr. et al. | 208/216 R |
| 4,048,060 | 9/1977 | Riley | 208/210 |
| 4,191,635 | 4/1980 | Quick et al. | 208/89 |
| 4,202,798 | 5/1980 | Johnson et al. | 208/217 |
| 4,267,033 | 5/1981 | Heck et al. | 208/216 P |
| 4,357,263 | 11/1982 | Heck et al. | 208/216 PP |
| 4,395,328 | 7/1983 | Hensley, Jr. et al. | 208/216 PP |
| 4,395,329 | 7/1983 | LePage et al. | 208/216 PP |
| 4,414,141 | 12/1983 | Schindler | 502/314 |
| 4,434,048 | 2/1984 | Schindler | 208/112 |
| 4,444,905 | 4/1984 | Pessimisis | 208/217 |
| 4,460,707 | 7/1984 | Simpson | 208/216 PP |
| 4,472,528 | 9/1984 | Berg et al. | 502/220 |
| 4,500,424 | 2/1985 | Simpson et al. | 208/216 PP |

*Primary Examiner*—John Doll
*Assistant Examiner*—Anthony McFarlane
*Attorney, Agent, or Firm*—Bachman & LaPointe

[57] ABSTRACT

A catalyst for the hydrotreatment of heavy crudes and their residues, and a method of preparing same, is disclosed, which has significant simultaneous hydrodemetallizing and hydrodesulfurizing activity. The catalyst is prepared by successively impregnating an extruded refractory support with a Group VIb and a Group VIII metal, calcining the pellet thus produced, and presulfurizing same. Pore volume of the catalyst ranges between 0.50 and 1.2 ml/g, total surface area ranges between 120 and 400 m$^2$/g, at least 60% of said pore volume consists of pores having diameters greater than 100 Å, and X-ray photoelectron spectroscopy signal band strength ratios are as follows: I(Me VIb)/I(refractory metal) is between 5 and 8, and I(Me VIII)/I(refractory metal) is between 1 and 5. The novel catalyst has a useful life greater than conventional catalysts for the simultaneous hydrodemetallization and hydrodesulfurization of continuous feeds of heavy hydrocarbons, as shown by the fact that it exhibits no substantial reduction in catalytic activity over an 80 day period.

14 Claims, 2 Drawing Figures

EXAMPLE 2: RELATION OF AVERAGE CATALYST PORE DIAMETER TO CONSTANTS $K'_V$ AND $K'_S$

KEY: O = $K'_V$   △ = $K'_S$

EXAMPLE 2: RELATION OF TOTAL CATALYST PORE VOLUME TO CONSTANTS $K'_V$ AND $K'_S$

KEY: O = $K'_V$   △ = $K'_S$

EXAMPLE 2: RELATION OF TOTAL CATALYST PORE VOLUME TO CONSTANTS $K_V'$ AND $K_S'$

KEY: O = $K_V'$   △ = $K_S'$

EXAMPLE 2: RELATION OF AVERAGE CATALYST PORE DIAMETER TO CONSTANTS $K'_V$ AND $K'_S$

KEY: $O = K'_V$  $\triangle = K'_S$

CATALYST FOR REMOVING SULFUR AND METAL CONTAMINANTS FROM HEAVY CRUDES AND RESIDUES

CROSS REFERENCE TO RELATED APPLICATION

This application is a continuation-in-part of application Ser. No. 563,197, filed Dec. 19, 1983 now U.S. Pat. No. 4,501,128.

BACKGROUND OF THE INVENTION

The use of catalysts for the demetallization of hydrocarbons of petroleum origin has been known for some time. Demetallization of such crudes is desirable in order to reduce the concentrations of contaminating metals such as vanadium, nickel, and iron, because the contaminating metals reduce the useful life of contacted catalysts used in refining operations, such as hydrocracking, hydrodesulfurization and catalytic cracking. These contaminating metals act as poisons to the aforesaid contacted catalysts used in refining operations and therefore require that said contacted catalyst be replaced after a shorter period than would otherwise occur.

Various metals have been used as catalysts in eliminating contaminating metals and sulfur present in petroleum hydrocarbons For example, the elimination of metals can be accomplished by using bauxite as a catalyst, see U.S. Pat. Nos. 2,687,983 and 2,769,758, using iron oxide and alumina, see U.S. Pat. No. 2,771,401, or using macroporous aluminas in a boiling bed, see U.S. Pat. No. 3,901,792.

A multi-step hydrotreatment method overcoming some disadvantages of single step procedures is disclosed in U.S. Pat. No. 3,696,027. This multi-stage process consists of passing a heavy hydrocarbon, at high pressures and temperatures and in the presence of hydrogen, through a three-phase reactor which uses macroporous catalyst particles. This catalyst has a high capacity for accepting metals but a low desulfurizing activity. The effluent as treated by the first macroporous catalyst is then subjected to a fixed-bed reactor phase at a high temperature and pressure together with hydrogen, the fixed bed containing catalyst particles having a moderate desulfurizing activity. Finally, the effluent from the preceding reactor is subjected to a third fixed-bed reactor using high temperatures and pressures, once again with hydrogen, the fixed bed in this phase containing catalyst particles which have a high desulfurization activity.

SUMMARY OF THE INVENTION

Accordingly, a principal object of the invention is to provide a catalyst, and a method for preparing same, for the simultaneous hydrodemetallization and hydrodesulfurization of heavy crudes.

A still further object of the present invention is to provide a catalyst, and a method for preparing same, which is capable of simultaneously hydrodemetallizing and hydrodesulfurizing heavy crudes over a long period of time, such that no significant decrease in demetallizing or desulfurizing activity occurs over at least 80 days of continuous processing of a heavy crude.

Further objects and advantages of the present invention will become apparent from the Detailed Description of Preferred Embodiments which follows.

In accordance with the present invention it has now been found that the foregoing objects and advantages of the present invention may be readily obtained. Thus, the method of the present invention comprises a method for the preparation of a catalyst for the hydrotreatment of heavy crudes and their residues having high metal and sulfur contents, which comprises: providing a refractory support structure; impregnating the support structure with at least one compound containing a metallic component selected from Group VIb of the Periodic Table and Group VIII of the Periodic Table, said Group VIb compound being present in the impregnated support in concentrations ranging from 5 to 30% by weight, and said Group VIII compound being present in said support in concentrations ranging from about 1 to 5% by weight; drying the impregnated support; and calcining the dried impregnated support with a hot dry air current at a temperature of about 400° to 600° C., using an air volume of 40-100 ml/(g catalyst) (hour), whereby a catalyst possessing significant simultaneous demetallizing and desulfurizing activity over a long useful life is obtained.

The catalyst of the present invention comprises a catalyst for the simultaneous demetallization and desulfurization activity, comprising the following steps: extruding a support comprising alumina, which support has a pore volume between 0.8 and 0.9 ml/g, an average pore diameter of about 250 Å, a surface area of about from 130 to 300 m$^2$/g, and a pellet size ranging between 1/60 inch to ⅛ inch; impregnating said support with a first metallic compound having a metallic component and a nonmetallic component, said metallic component being selected from the group consisting of molybdenum, tungsten and mixtures thereof, said impregnation taking place in a buffered aqueous solution of said first metallic compound during a period of about 4 hours at ambient temperature and moderate agitation so as to obtain a catalyst composition of 5-30% by weight of said metallic component; drying the impregnated support at about 120° C. for about 24 hours at atmospheric pressure; impregnating said dried support with a second metallic compound having a metallic component and a nonmetallic component, said metallic component being selected from the group consisting of cobalt, nickel and mixtures thereof, said second impregnation taking place in an aqueous solution of said second metallic compound during a period of from about 2 to about 3 hours, so as to obtain a catalyst composition of 0.1-8% by weight of said second metallic component; drying the reimpregnated support at about 120° C., for about 24 hours; calcining the dried support at about 600° C. for a period ranging from 1 to 24 hours, with a dry air circulation of 50 ml/(hr.) (g support); and presulfurizing the calcined support at a temperature between 200° and 400° C., using a sulfur material selected from the group consisting of sulfur, mercaptans, hydrogen sulfide and mixtures thereof, whereby an effective catalyst is obtained.

In accordance with a preferred embodiment, a refractory oxide support structure is extruded and impregnated with metals from Group VIb and Group VIII of the Periodic Table, such that a distribution of mesopores (100-600 Å) and macropores (600 Å+) is obtained whereby the average pore diameter ranges between 150 and 300 Å.

In addition, the catalyst preferably comprises a refractory oxide support and a plurality of deposited active metals, wherein the catalyst has a pore volume between 0.50 and 1.2 ml/g, at least 60–80% and preferably at least 90% of which volume consists of pores having diameters greater than 100 Å, said catalyst also having a surface area of 120–400 m$^2$/g, and showing X-ray photoelectron spectroscopy signal band strength ratios of $5 < I(\text{metal VIb})/I(\text{refractory metal}) < 8$ and $1 < I(\text{metal VIII})/I(\text{refractory metal}) < 5$, respectively.

DETAILED DESCRIPTION OF PREFERRED EMBODIMENTS

Figure 1:
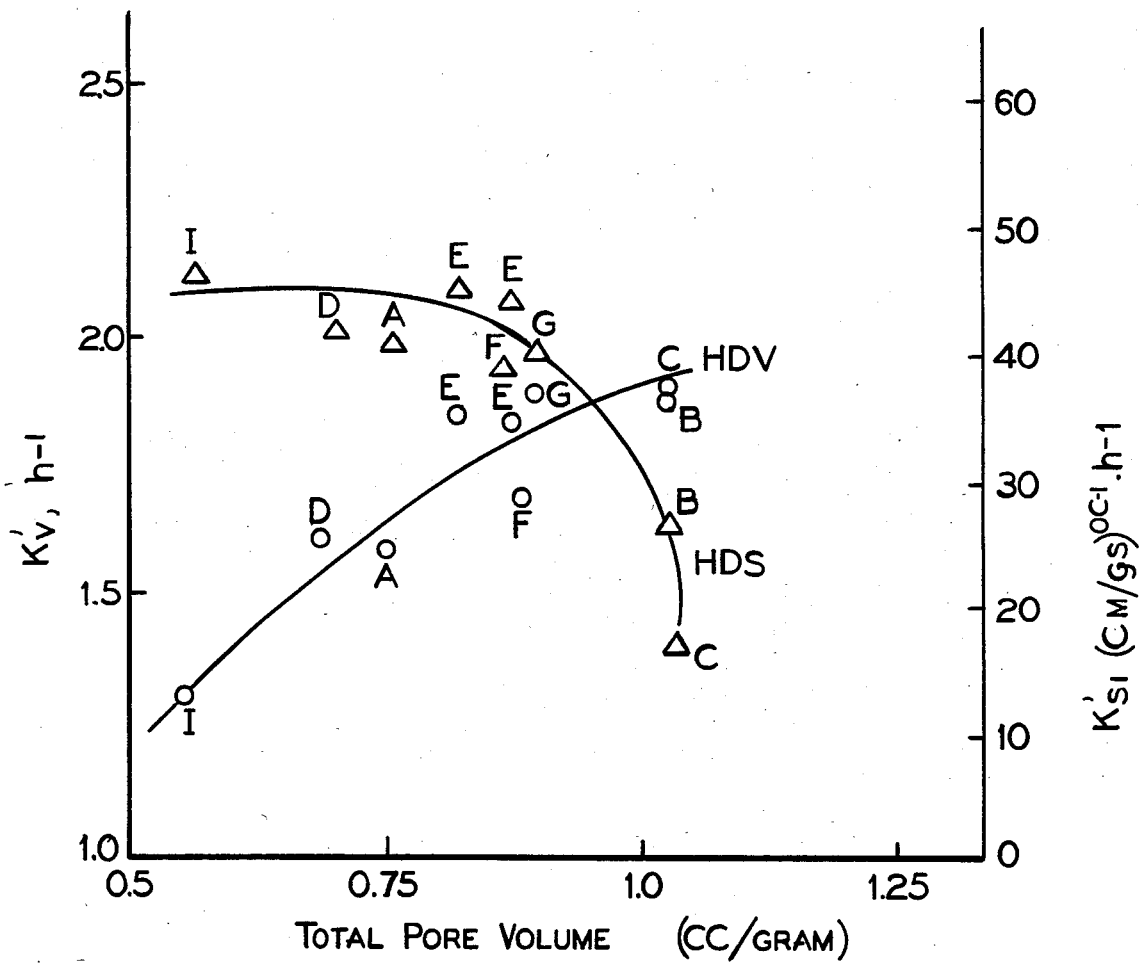
FIG. 1 is a graph showing the relation between hydrodemetallization constant $K_v'$, hydrodesulfurization constant $K_s'$, and the total pore volume of several catalysts tested in Example 2.

Simultaneous demetallization and desulfurization of a heavy crude can be accomplished by using catalysts having a controlled distribution of mesopores and macropores. The term "mesopores" refers to the portion of the total pore volume consisting of pores having a diameter in the range of 100 to 600 Angstroms, as determined by the nitrogen absorption method disclosed by E. V. Ballou and O. K. Dollem in *Analytical Chemistry*, Volume 32, page 532 (1960). The term "macropores" refers to the portion of the total pore volume which consists of pores having a diameter greater than 600 Angstroms, as determined by a Mercury Penetration Porosimeter 915-2, manufactured by Micromeritics Corporation, Georgia, using a 140° contact angle and a mercury surface tension of 474 dynes per centimeter at 25° C. The term "total pore volume" of the catalyst as used in this specification refers to the sum of mesopore volume and the macropore volume as determined by the above methods.

The term "demetallization" as used herein refers to the elimination of 70% of the metals contained in heavy crudes or residues, as effected by having petroleum hydrocarbons pass across a reaction zone containing the catalyst of the invention. The term "desulfurization" likewise refers to the elimination by the catalyst of 70% of the sulfur present in the heavy hydrocarbon before passage through the reaction zone.

In preparing the catalyst of the present invention, a refractory oxide support is used and the support as well as the resultant catalyst has the following characteristics: total pore volume ranging between 0.50 and 1.20 ml/gram (preferably about 0.8 to 0.9 ml/g); average pore diameter varying between 150 and 300 Angstroms (preferably about 250 Å); and surface area varying between 120 and 400 m$^2$/gram (preferably about 130–300 m$^2$/g). The catalyst supports should be extruded in pellet sizes which may fall in the range of from 1/60 to ⅛ inch. The support material which will meet the above specifications may be selected from the following refractory oxides: alumina, silica, magnesia, zirconia, titania or a mixture of the aforementioned, as used alone or impregnated with stabilizing materials. Alumina, silica or a mixture thereof are preferred support materials.

After the suppports are extruded, compounds containing the catalytically active metals are deposited on the supports by impregnation. Various methods of impregnating active metals on a refractory oxide support are known in the art. In general, they can be classed into successive impregnation methods, dry impregnation methods, and co-impregnation methods.

In a successive impregnation method, the support is first impregnated with any one of the active metals, and is then passed to a drying and/or calcination stage. The cycle is repeated for the second and subsequent active metals.

In carrying out a dry impregnation, an exact volume of active metal compound solution equal to the retention volume of the refractory oxide support is added which will then be completely absorbed.

Co-impregnation is carried out by placing the refractory oxide or support in contact with a solution containing all of the active metals of the catalyst. The impregnated catalyst then proceeds to the drying and/or calcining stages.

The present invention uses two stages of successive impregnation. An extruded refractory oxide support which has the above-mentioned physical specifications is put into contact with, for example, a solution of ammonium molybdate, ammonium paramolybdate, molybdenum oxalate or molybdenum pentachloride, or with a corresponding soluble salt of another Group VIb metal. In order to obtain a composition of 5–30% by weight of molybdenum or other Group VIb metal on the support, the first impregnation stage should last about 4 hours at ambient temperature and moderate agitation. The pH of the impregnating solution is held constant with the addition of a buffer solution. At the end of the first impregnation period, the Group VIb solution is drained off and the moist impregnated catalyst is placed into a furnace with air circulation at 120° C. and at atmospheric pressure for 24 hours.

The refractory oxide support as impregnated with Group VIb metal is then put into contact with an aqueous cobalt nitrate or nickel nitrate solution in order to obtain a concentration of 0.1 to 8% by weight of nickel or cobalt on the catalyst. The period of the second impregnation ranges from 2 to 3 hours. The catalyst is dried for 24 hours, using a temperature of 120° C., and calcined at 600° C. for a period of from 1 to 24 hours. The volume of dry air is circulated at a rate of 50 milliliters of air per hour per gram of catalyst during calcination.

Any element of Group VIb of the Periodic Table may be used for catalytic demetallization in the present invention. Molybdenum and tungsten are preferably used, as oxides or sulfides in their final reactive form, preferably in quantities ranging from about 6 to about 25% by weight (as oxide) with respect to the total weight of the catalyst. As species within Group VIII of the Periodic Table, nickel and cobalt are preferred, as sulfides in their ultimate form and preferably in quantities ranging between about 1 and 5% with respect to the total weight of the catalyst, calculated as oxide.

After impregnation and calcination, the catalyst is next sulfurized at temperatures between 200° and 400° C., at either atmospheric or higher pressures using elementary sulfur, sulfur compounds such as mercaptans or mixtures of hydrogen and hydrogen sulfide, or mixtures thereof.

The completed catalyst has the following spectroscopic properties. As determiend by X-ray photoelectron spectroscopy (XPS), the catalyst exhibits a signal band strength ratio I(Me VIb)/I(refractory metal) which ranges from 5 to 8, where Me VIb is the Group VIb metal selected. Similarly, I(Me VIII)/I(refractory metal) ranges from 1 to 5.

The catalyst reveals no important information when subjected to X-ray diffraction spectroscopy. Infrared spectroscopy shows an intense peak between 930 and 950 cm$^{-1}$, which is characteristic of Co-Mo or Ni-Mo bonds. On the other hand, only a poorly defined signal occurs between 950 and 960 cm$^{-1}$, which indicates that undesirable polymolybdate is present in small quantities only.

The following examples are given in order to more fully describe, but not to limit, the invention.

EXAMPLE 1

To test the effectiveness of the catalyst according to the present invention in demetallizing and desulfurizing hydrocarbons of petroleum origin, Venezuelan heavy crudes were used as experimental chargestocks which generally contain 300 ppm of nickel, vanadium and iron, 7 to 12% by weight of Conradson carbon, 5 to 10% by weight of asphaltenes, and 3 to 5% by weight of sulfur. These heavy crudes were subjected to a simultaneous demetallization and desulfurization using the catalyst of the present invention in the presence of hydrogen at a temperature ranging between 360° and 415° C., a pressure ranging between 600 and 3000 psi, a liquid hourly space velocity (LHSV) between 0.1 to 10 volumes per volume-hour and a H$_2$:feed ratio of from 2000 to 6000 SCF/bbl.

In this example, comparative tests of initial catalytic activities were made using a catalyst of the prior art and a catalyst according to the present invention. The physical-chemical characteristics of the conventional catalyst (I) and of the catalyst of the invention (F) are summed up in Table I.

TABLE I
EXAMPLE I: PHYSICAL AND CHEMICAL PROPERTIES OF CATALYST I AND F

| Properties | CATALYST I (prior art) | CATALYST F (invention) |
|---|---|---|
| % MoO$_3$, by weight | 14.5 | 5.8 |
| % CoO | 5.1 | — |
| % NiO | — | 0.98 |
| % Al$_2$O$_3$ | complement | complement |
| Surface area, m$^2$/gram | 285 | 177 |

TABLE I-continued
EXAMPLE I: PHYSICAL AND CHEMICAL PROPERTIES OF CATALYST I AND F

| Properties | CATALYST I (prior art) | CATALYST F (invention) |
|---|---|---|
| Total pore volume, ml/gram | 0.64 | 0.84 |
| Average pore diameter, Å | 77 | 189 |
| Bulk crushing strength, kg/cm$^2$ | 10.3 | 1.72 |
| Pellet size, inches | 1/16 | 1/16 |
| Pore volume distribution, % | — | — |
| 20–30Å | 2.8 | 0.0 |
| 30–60Å | 40.3 | 0.0 |
| 60–90Å | 51.6 | 0.0 |
| 90–150Å | 6.3 | 24.39 |
| 150–300Å | 1.6 | 65.85 |
| 300–10$^3$Å | — | 6.10 |
| >10$^3$Å | — | 3.66 |

The catalytic activity of Catalysts I and F were compared by testing them on a Venezuelan Morichal crude. The crude treated had 338 ppm vanadium, 2.7% sulfur, 10.7% Conradson carbon, 8.25% asphaltenes and had a specific gravity of 11.7 °API. A sample of this crude was put into contact with the aforementioned catalysts at a temperature of 400° C., a pressure of 1500 psi, a liquid hourly space velocity (LHSV) of 1 h$^{-1}$ and an H$_2$:batch volumetric ratio of 800 m$^3$(STP)/m$^3$. The results are shown in Table II, wherein "%HDS" and "%HDV" are percentage hydrodesulfurization and hydrodemetallization, respectively.

TABLE II
EXAMPLE I: INITIAL CATALYST ACTIVITY

| CATALYST | % HDS | % HDV | S = % HDV/% HDV |
|---|---|---|---|
| I (prior art) | 45.3 | 29.1 | 1.55 |
| F (invention) | 65.9 | 55.4 | 1.19 |

EXAMPLE 2

A series of experiments measuring demetallizing and desulfurizing activity were conducted using seven different catalysts made according to the invention. The chemical and physical properties of these catalysts, labelled A through G, are set out in Table III.

TABLE III
EXAMPLE II: PHYSICAL AND CHEMICAL PROPERTIES OF TESTED CATALYSTS

| CATALYST | A | B | C | D | E | F | G |
|---|---|---|---|---|---|---|---|
| MoO$_3$, % by weight | 12.9 | 15.0 | 13.4 | 8.1 | 6.0 | 5.8 | 5.9 |
| CoO, % by weight | — | 3.5 | 3.6 | — | — | — | — |
| NiO, % by weight | 2.4 | — | — | 1.7 | 1.9 | 0.98 | 2.2 |
| Surface Area (BET), m$^2$/gram | 79 | 300 | 292 | 177 | 168 | 177 | 140 |
| Pore Volume, cc/gram | 0.75 | 1.07 | 1.06 | 0.67 | 0.86 | 0.84 | 0.88 |
| Average Pore Diameter, Å | 379 | 143 | 145 | 151 | 204 | 189 | 251 |
| Bed Density, grams/cc | 0.83 | 0.41 | 0.82 | 0.58 | 0.53 | 0.47 | 0.41 |
| Real Density, grams/cc | 2.37 | 5.58 | 6.14 | 4.77 | 4.07 | 4.30 | 3.69 |
| Apparent Density, grams/cc | 0.83 | 0.77 | 0.56 | 1.10 | 0.93 | 0.93 | 0.87 |
| Pellet Crushing Strength, kg/pellet | 4.95 | 3.0 | — | Fragile | 2.16 | Fragile | 2.00 |
| Bulk Crushing Strength, kg/cm$^2$ | — | 7.16 | 7.12 | — | 6.17 | 1.72 | 5.89 |
| Pore Distribution, %: | | | | | | | |
| 20–30Å | 3.97 | — | — | 14.41 | — | — | — |
| 30–60Å | 0.65 | 19.30 | 2.94 | 14.41 | — | — | — |
| 60–90Å | 2.64 | 19.10 | 37.25 | 10.81 | — | — | 4.00 |
| 90–150Å | 13.93 | 13.08 | 11.76 | 19.82 | 20.51 | 24.39 | 10.67 |
| 150–300Å | 58.74 | 7.13 | 8.82 | 28.82 | 71.53 | 65.85 | 13.33 |
| 300–10$^3$Å | 17.22 | 3.57 | 6.86 | 5.41 | 6.98 | 6.10 | 17.33 |
| >10$^3$Å | 2.65 | 38.05 | 32.35 | 6.31 | 0.98 | 3.66 | 54.67 |

In addition, similar tests were conducted for prior art catalyst I, whose properties can be found in Table I.

The experimental conditions and hydrocarbon feedstock used in these tests were the same as those of Example I.

The reuslts of the tests are compiled in FIG. 1, which plots total catalyst pore volume against demetallization constant $K_v'$, and desulfurization constant $K_s'$.

FIG. 1 shows that catalysts E, F and G, which each have a total pore volume of from 0.8 to 0.9 ml/gram, have significant simultaneous demetallizing and desulfurizing activity. Catalysts B and C, which have a pore volume greater than 1.0 ml/gram, have a greater demetallizing activity than desulfurizing activity. Finally, conventional catalyst I has a significant desulfurizing activity only.

Figure 2:
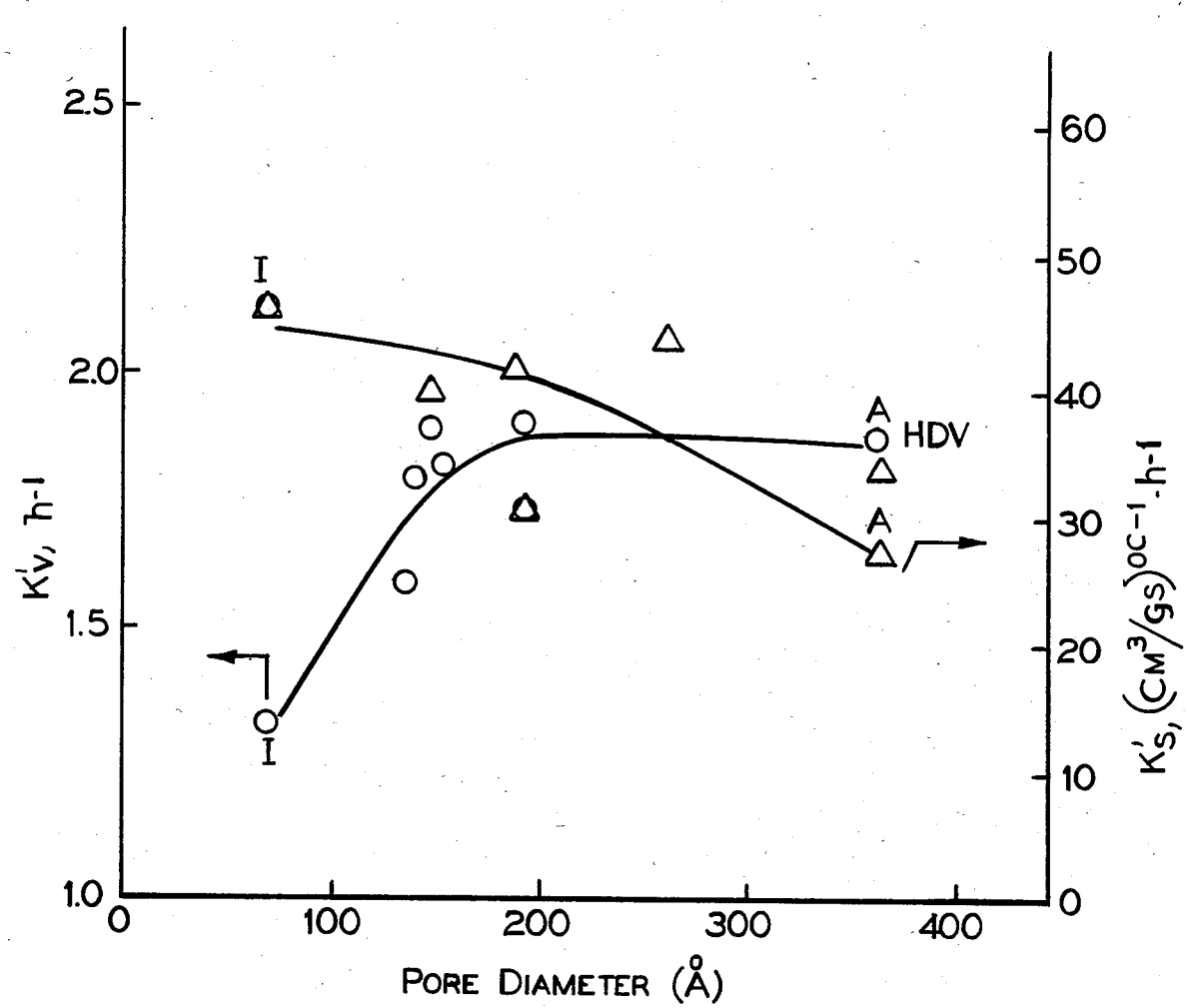
FIG. 2 is a graph showing the relation between $K_v'$, $K_s'$, and average pore diameter of several catalysts tested in Example 2.

FIG. 2 plots the average pore diameter of the catalysts versus their observed demetallization and desulfurization constants $K_v'$ and $K_s'$. These data show that in order for a catalyst to have significant simultaneous demetallization and desulfurization activity, the average pore diameter should range between 200 and 300 Angstroms.

EXAMPLE 3

In this example, catalysts E, F and G, which showed simultaneous demetallizing and desulfurizing activity in Example 2, were modified so as to increase the active metal concentrations in order to show that the observed simultaneous effects were not due to low metallic contents. $MoO_3$ was increased up to about 15% by weight of the catalyst, and the concentration of NiO was increased to about 5%.

Table IV shows that the ratio of demetallization to desulfurization activities does not change with the increase in active metals content of the catalysts.

TABLE IV

EXAMPLE 3: INFLUENCE OF METALLIC CONTENT ON RELATIVE HDV AND HDS ACTIVITY

| CATALYST | % $MoO_3$ | % NiO | S = % HDS/% HDV |
|---|---|---|---|
| F | 5.8 | 0.98 | 1.18 |
| F-1 | 14.3 | 4.20 | 1.20 |
| E | 6.0 | 1.90 | 1.20 |
| E-1 | 15.3 | 5.00 | 1.18 |
| G | 5.9 | 2.20 | 1.12 |
| G-1 | 14.8 | 4.80 | 1.10 |

EXAMPLE 4

Catalysts E and F of Examples 1 and 2 were tested in order to study the relation between signal band strength ratio as obtained by X-ray photoelectron spectroscopy (XPS) and the demetallizing and desulfurizing activity of the catalysts on whole heavy crudes. All catalysts were presulfurized in the manner described earlier in the specification. The results obtained are shown in Table V.

TABLE V

EXAMPLE 4: RELATION BETWEEN XPS RATIO I(Mo3d)/I(Al2p) AND HDS AND HDV ACTIVITY OF THE CATALYSTS

| Catalyst | I(Mo3d)/I(Al2p) | % HDS | % HDV |
|---|---|---|---|
| F-1 | 5 | 20 | 58 |
| F-2 | 8 | 50 | 59 |
| F-3 | 9 | 60 | 60 |
| E-1 | 9 | 70 | 68 |
| E-2 | 5 | 30 | 69 |

From Table V it can be seen that there is a strong relation between the simultaneous demetallization and desulfurization of heavy crudes and the I(Mo3d)/I(Al2p) signal band strength ratio of the catalysts. Reduction of this signal band strength ratio is uniformly accompanied by a decrease in the HDS activity of the catalysts.

EXAMPLE 5

The catalysts E and F of Examples 1 and 2 and conventional catalyst I were tested in order to study their useful lives in demetallizing and desulfurizing a continuous feed of heavy crude. The experimental conditions were as follows: T=400° C.; hydrogen pressure=1500 psi; LHSV=1 $h^{-1}$ and $H_2$:feed=1000 $m^3$(STP)/$m^3$. The results obtained are shown in Table VI.

TABLE VI

EXAMPLE 5: CATALYTIC ACTIVITIES OVER USEFUL LIVES OF CATALYSTS

| | % HDS | | % HDV | |
|---|---|---|---|---|
| CATALYST | Initial 24 hours | Final 80 days | Initial 24 hours | Final 80 days |
| I (CONVENTIONAL) | 50 | 30 | 29 | 0 |
| F (INVENTION) | 70 | 65 | 60 | 60 |

The results of the preceding table clearly show the effectiveness of the catalyst of the present invention for the simultaneous and stable demetallization and desulfurization of heavy crude feeds or their derivatives which have high metal and sulfur contents.

EXAMPLE 6

The catalyst F of Example 1 and conventional catalyst I of Example 5 were tested in order to study their useful lives in demetallizing and desulfurizing a continuous feed of Cerro Negro Residual 350° C.+. The experimental conditions were as follows: T =400° C., Hydrogen pressure=1800 psig; LHSV=1 $h^{-1}$ and $H_2$/Feed=1000 $Nm^3/m^3$. The properties of Residual 350° C.+are summarized in Table VII.

TABLE VII

CHARACTERISTICS OF RESIDUAL 350° C.+ CERRO NEGRO

| Properties | Residual 350° C.+ Cerro Negro |
|---|---|
| API gravity | 5.2 |
| Viscosity Cst, 140° F. | 3500 |
| Conradson Carbon, % by Wt | 17.1 |
| Asphaltenes, % by Wt | 12.1 |
| Sulfur, % by Wt | 4.53 |
| Nitrogen, ppm | 7700 |
| Vanadium, ppm | 535 |

Table VIII shows the results obtained with catalysts F and I. Catalyst F shows a substantial increase in the HDS and HDV catalytic activities over catalyst I. It may be seen that the new catalyst remains stable for more than 220 days, while catalyst I fails irreversibly after 70 operating days.

TABLE VIII

| CATA-LYSTS | CATALYTIC ACTIVITIES OVER USEFUL LIVES OF CATALYSTS | | | | | |
|---|---|---|---|---|---|---|
| | % HDS | | | % HDV | | |
| | 24 h | 80 day | 220 day | 24 h | 80 day | 220 day |
| I (Prior Art) | 40 | 25 | 15 | 20 | 0 | — |
| F (Invention) | 68 | 65 | 62 | 70 | 70 | 69 |

Without doubt, the newly developed catalyst is an attractive alternative to conventional catalysts when used for the hydrotreatment of heavy crudes and residues.

This invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A method for the preparation of a catalyst for the hydrotreatment of heavy crudes and their residues having high metal and sulfur contents, which comprises: providing an alumina refractory support structure; impregnating said support with a first metallic compound having a metallic component selected from Group VIB of the Periodic Table and a non-metallic component, said impregnation taking place in a buffered aqueous solution of said first metallic compound so as to obtain a catalyst composition of 5 to 30% by weight of said metallic component; drying the impregnated support; impregnating said dried support with a second metallic compound having a metallic component selected from Group VIII of the Periodic Table and a non-metallic component, said second impregnation taking place in an aqueous solution of said second metallic compound so as to obtain a catalyst composition of 0.1 to 8% by weight of said second metallic component; drying the re-impregnated support; and calcining the dried impregnated support with a hot dry air current at a temperature of about 400 to 600° C., using an air volume of 40-100 ml/(g catalyst) (hour), whereby a catalyst characterized by simultaneous demetallizing and desulfurizing activity wherein the ratio of percent of demetallizing to desulfurizing approaches unity over a useful life in excess of 80 days is obtained, said catalyst having the following physical properties: a total pore volume ranging from 0.8 to 0.9 ml/g, an average pore diameter of about between 200 to 300 Å and signal band strength ratios, as determined by X-ray photoelectron spectroscopy, as follows: I(Me VIb)/I(refractory metal) is between 5 and 8 and I(Me VIII)/I(refractory metal) is between 1 and 5.

2. The method of claim 1 wherein said support is an extruded refractory support.

3. The method of claim 1 wherein said Group VIb compound has a metallic component selected from the group consisting of molybdenum, tungsten and mixtures thereof.

4. The method of claim 1 wherein said Group VIII compound has a metallic component selected from the group consisting of nickel, iron, cobalt and mixtures thereof.

5. The method of claim 1, further comprising the step of presulfurizing said calcined support prior to its use as a hydrotreatment catalyst.

6. The method of claim 5 wherein said calcined support is pressulfurized at a temperature of between 200° and 400° C., using a sulfur material selected from the group consisting of elemental sulfur, mercaptans, hydrogen sulfide and mixtures thereof, whereby a sulfided catalyst is obtained.

7. A method according to claim 1 wherein the average pore diameter is about 240 to 280 Å.

8. A catalyst for the simultaneous demetallization and desulfurization of heavy crudes and residues, comprising an alumina support material, said support being impregnated by a first impregnating compound; said impregnated support is subsequently impregnated by a second impregnating compound, said first impregnating compound consisting essentially of a metallic compound whose metallic component is selected from Group VIb of the Periodic Table, deposited on said support material so as to comprise from 5 to 30% of the catalyst by weight, calculated as oxide; said second impregnating consisting essentially of a metallic compound whose metallic component is selected from Group VIII of the Periodic Table, deposited on said support material so as to comprise from 0.1 to 8% of the catalyst by weight, calculated as oxide; said first and second impregnating compounds being reacted with a sulfur-containing reagent after deposition so as to produce catalytically active sulfides whereby a catalyst characterized by simultaneous demetallizing and desulfurizing activity wherein the ratio of percent of demetallizing to desulfurizing approaches unity over a useful life in excess of 80 days is obtained, said catalyst having the following physical properties: a total pore volume ranging from about between 0.8 to 0.9 ml/g, an average pore diameter of about between 200 to 300 Å and signal band strength ratios, as determined by X-ray photoelectron spectroscopy, as follows: I(Me VIb)/I(refractory metal) is between 5 and 8 and I(Me VIII)/I(refractory metal) is between 1 and 5.

9. The catalyst of claim 8 wherein said support material comprises an extruded refractory oxide support.

10. The catalyst of claim 8 wherein said first impregnated compound has a metallic component selected from the group consisting of molybdenum, tungsten and mixtures thereof.

11. The catalyst of claim 8 wherein said second impregnating compound has a metallic component selected from the group consisting of cobalt, iron, nickel and mixtures thereof.

12. The catalyst of claim 8 wherein the metal component of said first impregnating compound comprises from about 6 to 25% by weight of the catalyst, calculated as oxide.

13. The catalyst of claim 8 wherein the metal component of said second impregnating compound comprises from about 1 to 5% by weight of the catalyst, calculated as oxide.

14. A catalyst according to claim 7 wherein the average pore diameter is about 240 to 280 Å.

* * * * *

UNITED STATES PATENT AND TRADEMARK OFFICE
CERTIFICATE OF CORRECTION

PATENT NO. : 4,588,709
DATED : May 13, 1986
INVENTOR(S) : ALFREDO L. MORALES ET AL.

It is certified that error appears in the above-identified patent and that said Letters Patent are hereby corrected as shown below:

Column 10, claim 8, line 27, after "impregnating" insert ---compound---.

Column 10, claim 14, line 64, change the dependency from "claim 7" to ---claim 8---.

Signed and Sealed this

Twenty-sixth Day of August 1986

[SEAL]

Attest:

DONALD J. QUIGG

Attesting Officer

Commissioner of Patents and Trademarks